(12) United States Patent
Jagannatharao et al.

(10) Patent No.: US 7,006,509 B1
(45) Date of Patent: Feb. 28, 2006

(54) METHOD AND SYSTEM FOR GRACEFUL SLOWLINK DELETION AND SUBSEQUENT FAST LINK ADDITION IN AN IMA GROUP

(75) Inventors: Manjunath Jagannatharao, San Jose, CA (US); Raja Rangarajan, Milpitas, CA (US); Rajagopalan Kothandaraman, Bangalore (IN); Saju Nair, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 749 days.

(21) Appl. No.: 09/746,514

(22) Filed: Dec. 22, 2000

(51) Int. Cl.
*H04L 12/28* (2006.01)
*H04J 3/06* (2006.01)
*H04J 3/04* (2006.01)

(52) U.S. Cl. .................. 370/412; 370/395.2; 370/535; 370/350

(58) Field of Classification Search ............... 370/535, 370/400, 412, 395.4, 395.43, 235, 350, 432, 370/437, 410, 413, 395.2, 351, 389, 395.1, 370/395.7, 536, 538, 543
See application file for complete search history.

(56) References Cited

U.S. PATENT DOCUMENTS

| | | | |
|---|---|---|---|
| 5,065,396 A | | 11/1991 | Castellano et al. |
| 5,293,570 A | | 3/1994 | Schmidt et al. |
| 5,333,132 A | | 7/1994 | Chuniaud et al. |
| 5,400,324 A | | 3/1995 | Eriksson et al. |
| 5,404,354 A | | 4/1995 | Hayter et al. |
| 5,448,572 A | * | 9/1995 | Knox et al. .................. 370/228 |
| 5,526,361 A | | 6/1996 | Hedberg |
| 5,608,733 A | * | 3/1997 | Vallee et al. ................ 370/394 |
| 5,617,417 A | | 4/1997 | Sathe et al. |
| 5,764,637 A | * | 6/1998 | Nishihara .................... 370/397 |
| 5,970,067 A | * | 10/1999 | Sathe et al. ................. 370/394 |
| 6,002,670 A | | 12/1999 | Rahman et al. |
| 6,148,010 A | * | 11/2000 | Sutton et al. ............... 370/536 |

(Continued)

FOREIGN PATENT DOCUMENTS

WO    WO 90-12467    10/1990

(Continued)

OTHER PUBLICATIONS

I. Widjajat et al., "A High-Capacity Broadband Packet Switch Architecture Vased on Multilink Approach", MIL-COM '92 Communications- Fusing, Command, Control and Intelligence.

(Continued)

*Primary Examiner*—Hanh Nguyen
(74) *Attorney, Agent, or Firm*—Blakely, Sokoloff, Taylor & Zafman LLP

(57) ABSTRACT

A method and system for graceful slowlink deletion and subsequent fast link addition in an inverse multiplexing over asynchronous transfer mode (IMA) group are disclosed in which data is received on one or more data links. The received data is written into a buffer for each data link. The data in the buffer for each data link is read faster than the data is written into the buffer. By reading data from a DCB faster than the data is written into the DCB, the differential delay caused by a slow link deletion can be reduced. As such, a fast link, which otherwise could not be added to an IMA group because of the slow link deletion, can now be added without writing over unread data.

15 Claims, 7 Drawing Sheets

U.S. PATENT DOCUMENTS

| | | | |
|---|---|---|---|
| 6,198,754 B1 * | 3/2001 | Nakayama | 370/536 |
| 6,205,142 B1 | 3/2001 | Vallee | |
| 6,222,858 B1 | 4/2001 | Counterman | |
| 6,411,701 B1 * | 6/2002 | Stademann | 379/221.03 |
| 6,449,658 B1 * | 9/2002 | Lafe et al. | 709/247 |
| 6,549,522 B1 * | 4/2003 | Flynn | 370/313 |
| 6,621,794 B1 | 9/2003 | Heikkinen et al. | |
| 6,678,275 B1 | 1/2004 | DeGrandpre et al. | |
| 6,680,954 B1 | 1/2004 | Cam et al. | |
| 6,717,960 B1 | 4/2004 | Anesko et al. | |

FOREIGN PATENT DOCUMENTS

| | | |
|---|---|---|
| WO | WO 93-03569 | 2/1993 |

OTHER PUBLICATIONS

-PCT Notification of Transmittal of the International Search Report of the Declaration for the International Application No. PCT/US95/10218, 7 pages (Dec. 5, 1995).

Katsuyuki Yamazaki et al., "ATM Transport with Dynamic Capacity Control for Interconnection of Private Networks", IEICE Transactions Comm., vol. E77-B No. 3 pp. 327-334 (1994).

Richard Valle et al., "The ATM Forum Technical Committee, Inverse Multiplexing for ATM (IMA) Specification".

Richard Valle et al., The ATM Forum Technical Committee, Inverse Multiplexing for ATM (IMA) Specification (Final Ballot- Draft #) Dec. 1998.

* cited by examiner

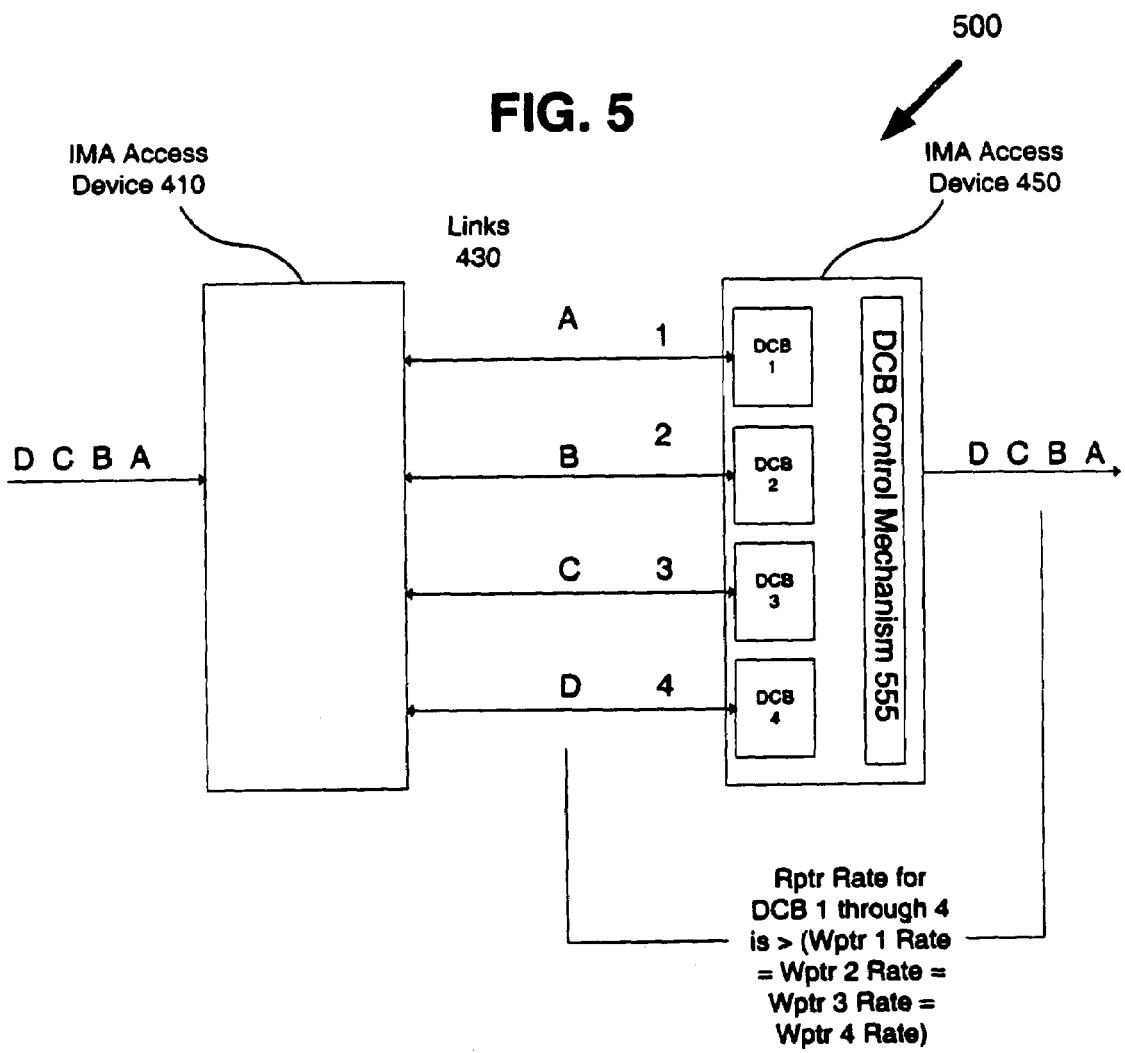

Rptr Rate > (Wptr 1 Rate = Wptr 2 Rate = Wptr 3 Rate = Wptr 4 Rate)

SLOW LINK DELETION

Rptr Rate > (Wptr 1 Rate = Wptr 2 Rate = Wptr 3 Rate = Wptr 4 Rate)

Rptr Rate > (Wptr 1 Rate = Wptr 2 Rate = Wptr 3 Rate = Wptr 4 Rate)

METHOD AND SYSTEM FOR GRACEFUL SLOWLINK DELETION AND SUBSEQUENT FAST LINK ADDITION IN AN IMA GROUP

FIELD OF THE INVENTION

The present invention pertains to the field of digital communications. More particularly, the present invention relates to a method and system for graceful slowlink deletion and subsequent fast link addition in an inverse multiplexing asynchronous transfer mode (IMA) group.

BACKGROUND OF THE INVENTION

An Asynchronous Transfer Mode (ATM) infrastructure is a popular form of Wide Area Network (WAN) technology. ATM provides a number of benefits such as speed, scalability, and traffic management to carry voice, video, and data using a single uniform protocol. ATM typically uses a T1/E1 link providing a maximum data rate of 1.544 Mbps/2.048 Mbps or a T3/E3 link providing a maximum data rate of 45 Mbps/34 Mbps. The cost of using a T3/E3 link, however, is typically ten times the cost of using a T1/E1 link. Consequently, if a T3/E3 link is used at a fraction of its maximum data rate, the T3/E3 link will not be used cost effectively.

Inverse multiplexing over ATM ("IMA") offers a solution to such a problem. The ATM Forum Technical Committee provides an "Inverse Multiplexing for ATM (IMA) Specification" ver. 1.1, January 1999, which is herein incorporated by reference, that describes IMA as dividing an aggregate stream of ATM cells across multiple T1/E1 links on a cell-by-cell basis. That is, IMA specifies a transmission method in which ATM cells are fanned across multiple T1/E1 links and then reassembled at the receiving end without loss of the original ATM cell order. By using T1/E1 links, a more cost effective data transmission can be achieved. For example, if an application requires a 5 Mbps transmission rate, 4 T1 links can be used providing bandwidth of approximately 6 Mbps 1 T3 link that provides bandwidth of 45 Mbps. As such, for the T3 link, 39 Mbps of bandwidth is not being used, which is not cost effective.

The constituent T1/E1 links for IMA, however, may have different transmission delays. For example, an ATM cell being transmitted on one link may pass through 2 or more hops (e.g., routers), however; another packet being transmitted on another link may only pass through 1 hop. This can cause differential delays among the T1/E1 links for an IMA group. To compensate for such a delay, an IMA group uses a delay compensation buffer (DCB) for each link. In prior IMA groups, the ATM cells from the faster links of the IMA group are buffered in a DCB and played out with a delay corresponding to the slowest link of the IMA group. Such a delay can cause a number of problems as will be explained in FIGS. 1 through 3.

FIG. 1 illustrates a diagram of a prior art buffering scheme 100 for an IMA group. Referring to FIG. 1, two DCBs 10 and 20 are shown for a two link IMA group. Link 1 for DCB 10 has a differential delay of 2 cells compared with link 2 for DCB 20. The read pointer ("Rptr") points to the DCB location for reading an ATM cell in the DCBs 10 and 20. Write pointer 1 ("Wptr 1") for DCB 10 indicates where the next ATM cell for link 1 is to be stored. Write pointer 2 ("Wptr 2") for DCB 20 indicates where the next ATM cell for link 2 is to be stored. Rptr operates at a per group basis so that cells are read out in the same order. Wptrs 1 and 2 operate at a per link basis and can point to different locations.

The Rptr moves as it reads out the cells (playback). The Wptrs 1 and 2 for each link move at the rate of cell arrival. Each link, however, may transmit packets or cells at a same rate, but may pass through different number of hops. Thus, data may arrive at different times at a receiving end for each link. In prior art DCB schemes, Rptr moves at the rate of the write pointer for the slowest link. In the case the slowest link is later deleted, this scheme can remain the same.

FIG. 2 illustrates a diagram 200 to describe a problem with the prior art buffering scheme for an IMA group. Referring to FIG. 2, two DCBs 10 and 20 are shown for a two link IMA group. If the IMA group allows a maximum delay of 275 milliseconds, to accommodate this amount of delay, the DCBs 10 and 20 should hold at least 1000 ATM cells for the two links. If link 1 for DCB 10 has a differential delay of 240 milliseconds (i.e., link 1 passes through more hops than link 2), the observed delay for the IMA group will be the same as the delay of the slowest link for DCB 10.

A disadvantage of such a scheme is that if link 1 is deleted or removed DCB 20 for link 2 will have 240 milliseconds of buffered ATM cells. That is, if Rptr moves at the rate of the buffer fill rate (i.e., Wptr 1 rate) the buffered ATM cells in DCB 20 never get drained up. Consequently, an unwanted accumulated delay of 240 milliseconds is introduced. Such an unwanted delay is equivalent to the maximum delay of the slowest link that was present in the IMA group.

FIG. 3 illustrates a diagram 300 to describe another problem of the prior art buffering scheme for an IMA group. Referring to FIG. 3, three DCBs 10, 20, and 30 are shown for a three link IMA group. Link 3, which has the fastest buffer fill rate, has a Wptr 3 at the "wrap around point." The wrap around point indicates that the "outside buffer range" is about to begin. Thus, if Wptr 3 is updated it will wrap around to the beginning of DCB 30. In FIG. 3, the prior buffering scheme would have Rptr rate equal to the buffer fill rate of DCB 10, which is the rate of Wptr 1.

A disadvantage of such a buffering scheme is that if a slow link (e.g., link 1) is waiting to be filled and a fast link (e.g., link 3) is rapidly being filled Wptr 3 will wrap around and cells in DCB 30 that has not been read will be lost. That is, such a prior art buffering scheme would overwrite the unread cells in DCB 30 after a wrap around. In such a case, link 3 could never be added to the IMA group.

Another disadvantage with such a scheme is that if another link is added that is faster than link 2, e.g., by 60 milliseconds, the overall delay of the group will be 300 milliseconds. Consequently, the added link will exceed the allowed maximum differential delay of 270 milliseconds. In such a case, even though the differential delay between two constituent links is 60 milliseconds, the new link cannot be added because it will violate the maximum delay allowable.

SUMMARY OF THE INVENTION

A method and system for graceful slowlink deletion and subsequent fast link addition in an IMA group are disclosed. For one embodiment, a method for inverse multiplexing is disclosed in which data is received on one or more data links. The received data is written into a buffer for each data link. The data in the buffer for each data link is read faster than the data is written into the buffer. By reading data from a DCB faster than the data is written into the DCB, the differential delay caused by a slow link deletion can be reduced. As such, a fast link, which otherwise could not be added to an IMA group because of the slow link deletion, can now be added without writing over unread data.

Other features and advantages of the present invention will be apparent form the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which:

FIG. 5 illustrates a diagram to control a plurality of delay compensation buffers (DCBs) according to one embodiment.

DETAILED DESCRIPTION

A method and system for graceful slowlink deletion and subsequent fast link addition in an IMA group are described. For one embodiment, a method for inverse multiplexing is disclosed in which data is received on one or more data links. The received data is written into a buffer for each data link. The data in the buffer for each data link is read faster than the data is written into the buffer. By reading data from a DCB faster than the data is written into the DCB, the differential delay caused by a slow link deletion can be reduced. As such, a fast link, which otherwise could not be added to an IMA group because of the slow link deletion, can now be added without writing over unread data.

In the following embodiments, the DCB buffering schemes support dynamic deletion and addition of links for an IMA group. Furthermore, an IMA group refers to devices for sending and receiving ATM cells over multiple T1/E1 links.

Figure 1:
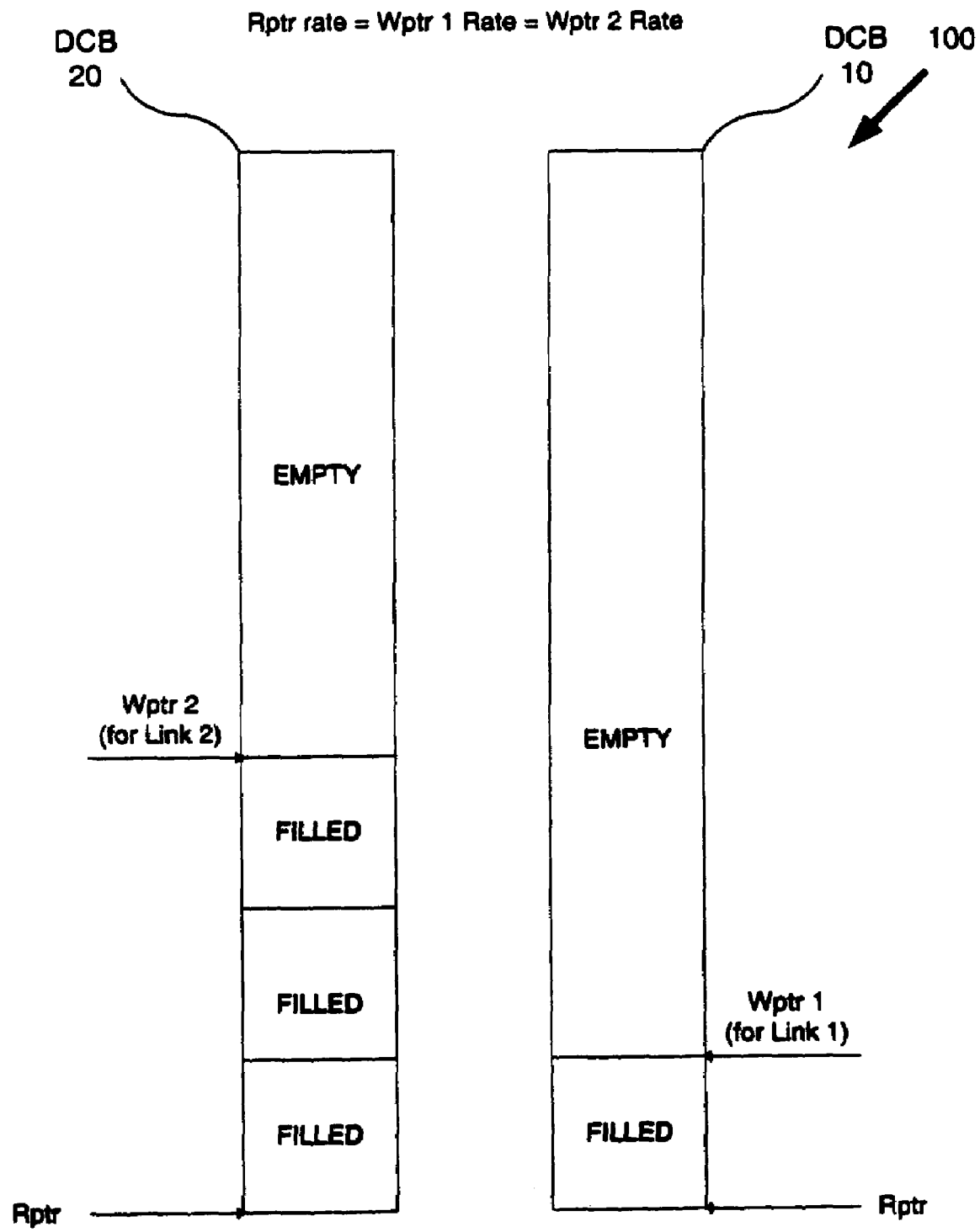
FIG. 1 illustrates a diagram of a prior art buffering scheme for an IMA group.
Figure 2:
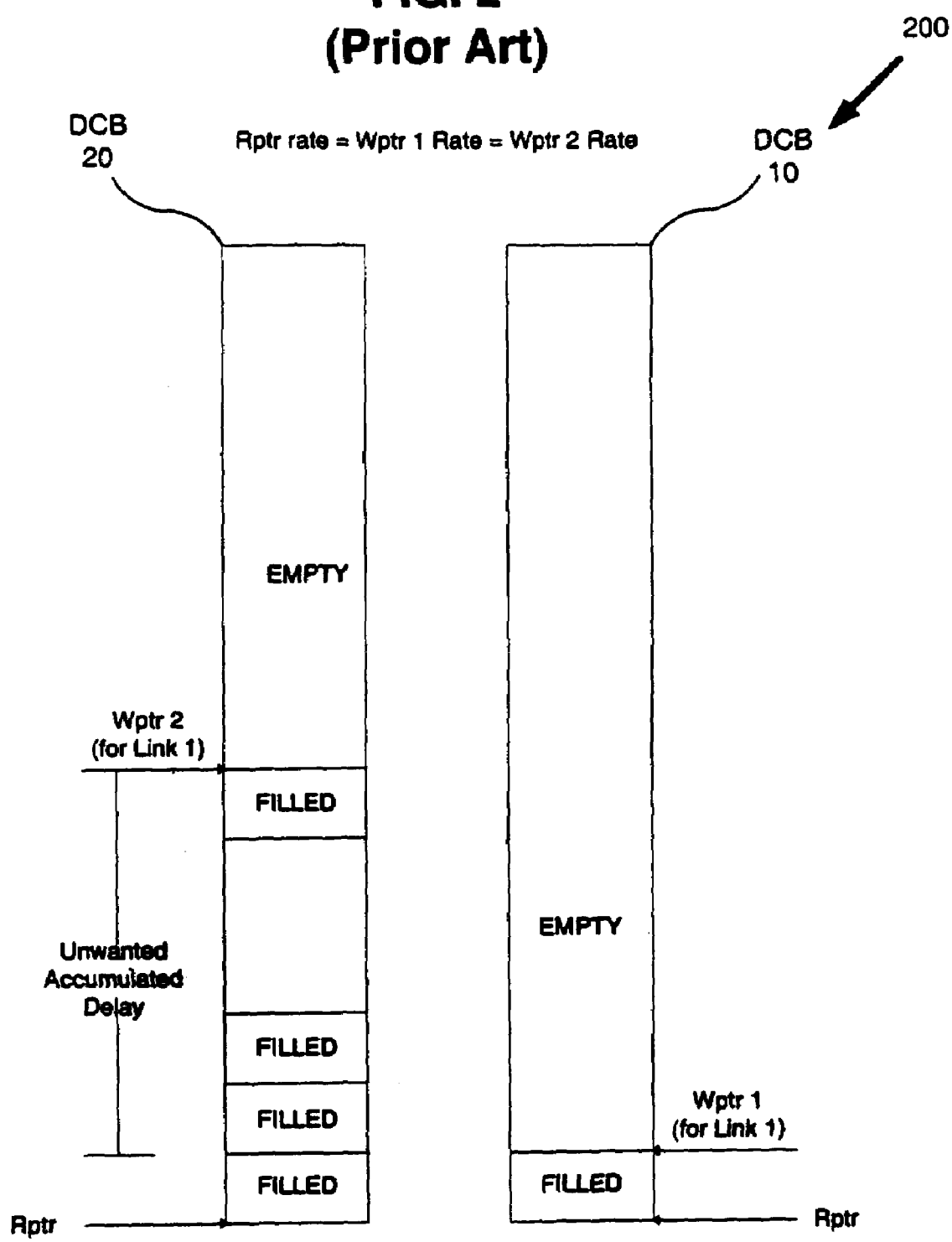
FIG. 2 illustrates a diagram to describe a problem with the prior art buffering scheme for an IMA group.
Figure 3:
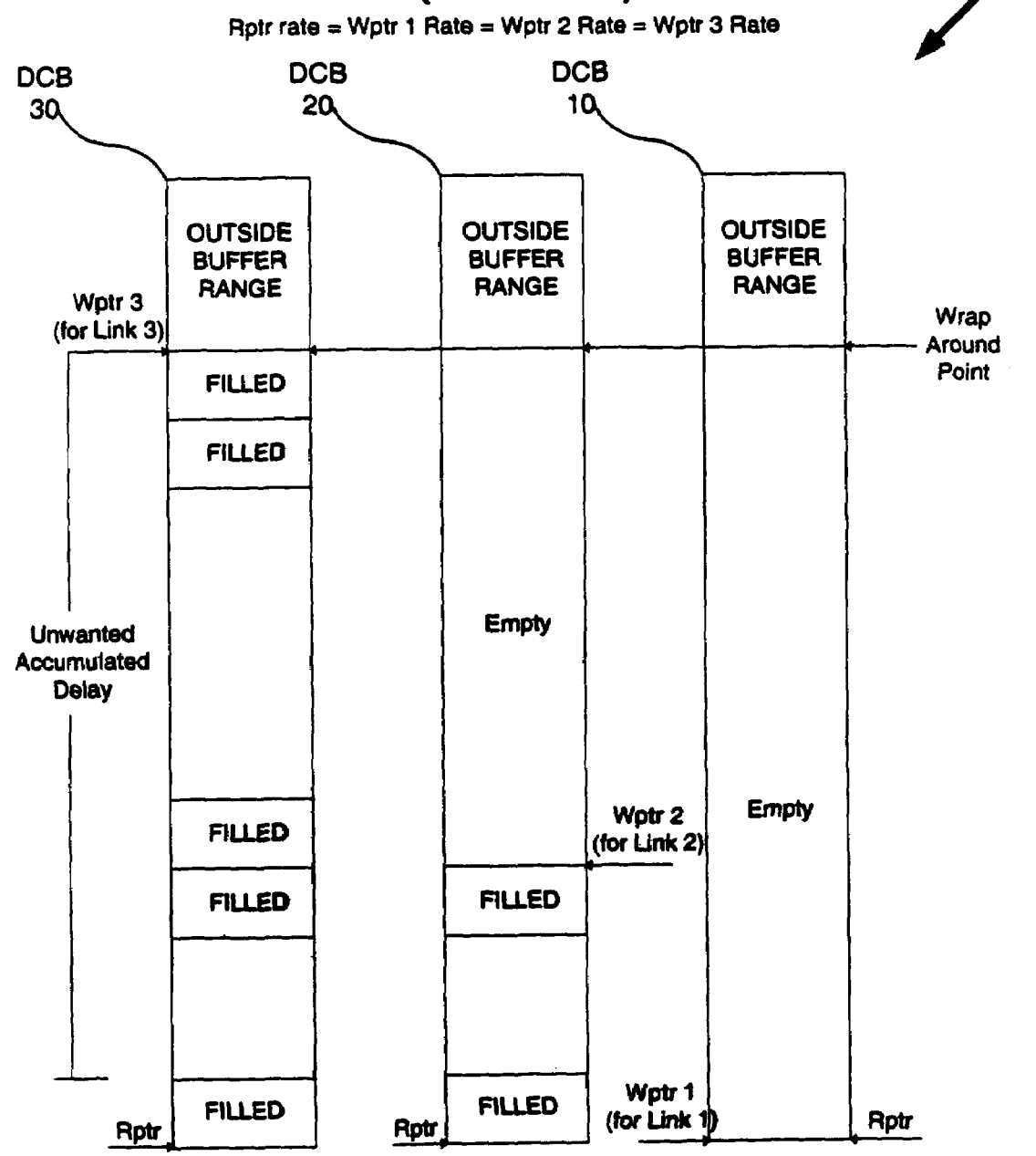
FIG. 3 illustrates a diagram to describe another problem with the prior art buffering scheme for an IMA group.
Figure 4:
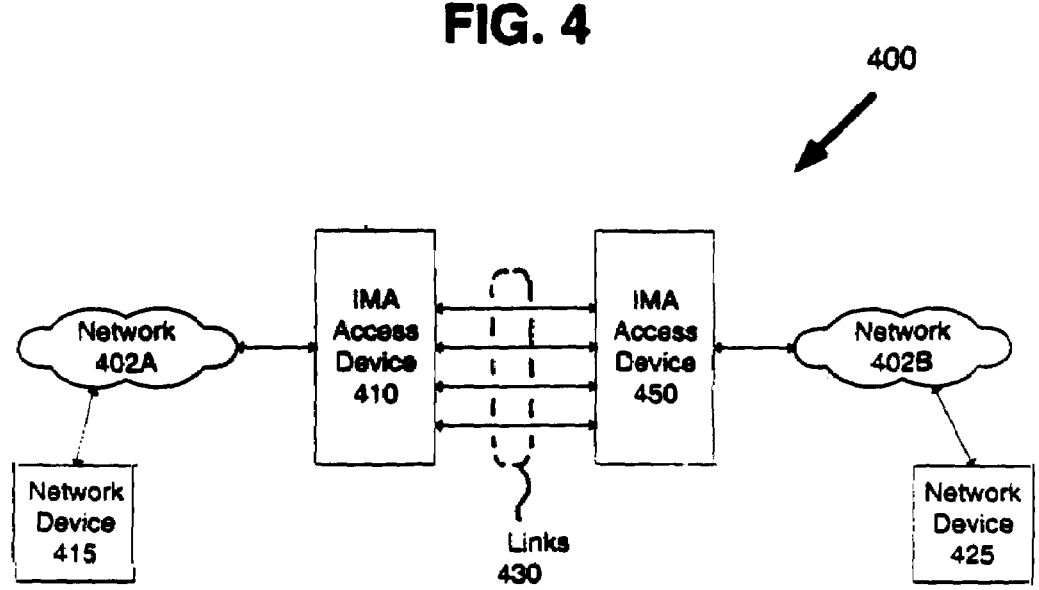
FIG. 4 illustrates a diagram of a network environment for inverse multiplexing over ATM in which the present invention can be implemented.

FIG. 4 illustrates a network environment 400 for inverse multiplexing over ATM in which the present invention can be implemented. Referring to FIG. 4, network device 415 is coupled to IMA access device 410 via network 402A. IMA access device 410 is coupled to IMA access device 450 via a plurality of links 430. IMA access device 450 is coupled network device 425 via network 402B. In the example of FIG. 4, network devices 415 and 425 can communicate with each other using inverse multiplexing over ATM (IMA).

In one embodiment, network devices 415 and 425 can be a general purpose computer, server, or workstation. In other embodiments, network devices 415 and 425 can be routers, gateways, hubs, bridges, or switches. Network devices 415 and 425, however, are not intended to be limited to any particular network device. Networks 402A and 402B can be a Wide Area Network (WAN) such as, for example, the Internet. Networks 402A and 402B, however, can implement other types of networks, which support transmission of ATM cells.

IMA access devices 410 and 450 are entry points to a network. IMA access devices 410 and 450 enable point to point IMA communication via links 430. In one embodiment, links 430 are T1 links that provide a maximum data rate of 1.544 Mbps. In an alternative embodiment, links 430 are E1 links that provide a maximum data rate of 2.048 Mbps. IMA access devices 410 and 425 distribute ATM cell streams over multiple links 430. IMA access devices 410 and 425 place the ATM cells on links 430 on a per-cell basis using a cyclic round-robin approach. For example, the first cell is sent on a first link, the second cell on a second link, and so forth. Each of the links 430 can pass through a different number of network devices or hops. Thus, ATM cells leaving IMA access device 410 can arrive at different times for IMA access device 450.

IMA access devices 410 and 450 can also communicate control information to inform each other of the status of each link and the quality of the connection needed for a particular service. IMA access devices 410 and 450 can recombine ATM cells if at the receiving end. In one embodiment, IMA access devices 410 and 450 can provide filler cells to maintain a constant stream of cells and to keep the round-robin process at both ends in sync whenever there is a lull in traffic. IMA access devices 410 and 450 can provide transparent inverse multiplexing to an application and to networks 402A and 402B by retaining ATM cell order and format.

As will be discussed in further detail below, IMA access devices 410 and 450 include delay compensation buffers (DCBs) that compensate for delay variations for links 430. In the following embodiments, IMA access devices 410 and 450 can reduce a differential delay caused by a slow link deletion. Thus, a fast link, which otherwise could not be added to the IMA group, can now be added using the buffering techniques described herein.

FIG. 5 illustrates a diagram 500 to control a plurality of delay compensation buffers DCB 1 through DCB 4. Referring to FIG. 5, IMA access device 410 is a sending end that transmits ATM cells of "A B C D" on links 430, which include links 1 through 4. IMA access device 450 is a receiving end that receives ATM cell "A" on link 1 in DCB 1, ATM cell "B" on link 2 in DCB 2, ATM cell "C" on link 3 in DCB 3, and ATM cell "D" on link 4 in DCB 4. IMA access device 450 also includes a DCB control mechanism 555 coupled to DCBs 1 through 4. DCB control mechanism 555 writes the ATM cells and reads the ATM cells to and from DCBs 1 through 4. To provide transparency of inverse multiplexing, DCB control mechanism 555 outputs the ATM cells in the same order that IMA access device 410 received them.

DCB control mechanism 555 implements a read pointer operation that circumvents the disadvantages of the prior art buffering schemes. For one embodiment, DCB control mechanism 555 controls a read pointer for DCBs 1 through 4 to move slightly faster than a write pointer for a link in the IMA group. That is, the cells are read out at a rate faster than they arrive into a DCB from links 430. For example, assume that cells arrive for each data link of the IMA group at every 276 microseconds. The write pointer of each link has to increment once every 276 microsecond.

In one embodiment, DCB control mechanism 555 moves the read pointer to drain out all cells at a slightly faster rate, e.g., once in every 275 microseconds. By reading data from a DCB slightly faster than the data is written into the DCB, the differential delay caused by a slow link deletion can be reduced. As such, a fast link, which otherwise could not be added to an IMA group because of the slow link deletion, can now be added without writing over unread data. In one embodiment, DCB control mechanism 555 will not declare an underrun situation if the read pointer, hits a write pointer once, but the read will not happen. If the read pointer hits a write pointer "X" number of times continuously, DCB control mechanism 555 will declare an underrun situation to stop reading data.

The DCB buffering techniques described herein can be implemented by hardware and/or software contained within DCB control mechanism 555. For example, DCB control mechanism 555 can execute code or instructions stored in a machine-readable medium (not shown) to perform the operations as described in FIGS. 6A through 6C. The machine-readable medium may include a mechanism that provides (i.e., stores and/or transmits) information in a form readable by a machine such a processor, computer, or a digital processing device. For example, a machine-readable medium may include a read only memory (ROM), random access memory (RAM), magnetic disk storage media, optical storage media, or flash memory devices. The code or instructions can be represented by carrier wave signals, infrared signals, digital signals, and by other like signals.

Figure 6A:
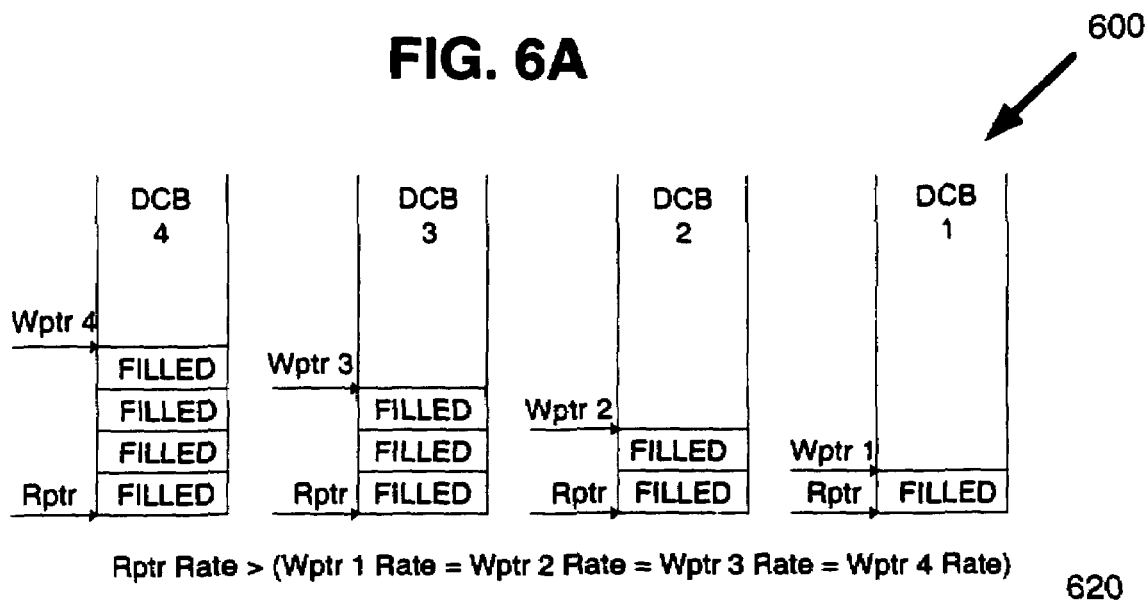
FIGS. 6A through 6C illustrate exemplary diagrams of buffering schemes for deleting a slow link and adding a fast link in an IMA group.
Figure 6B:
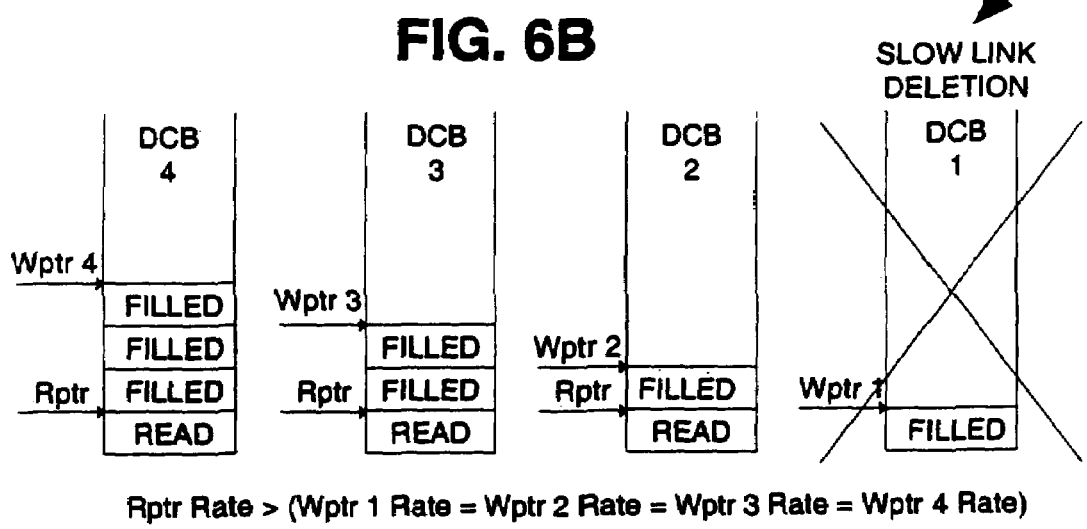
Figure 6C:
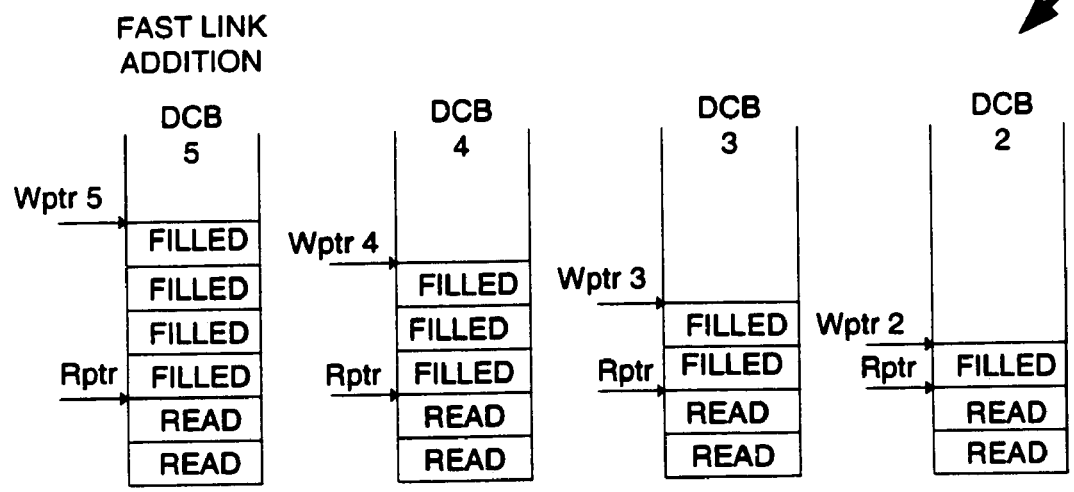

FIGS. 6A through 6C illustrate exemplary diagrams of buffering schemes for deleting a slow link and adding a fast link in an IMA group. FIG. 6A shows four DCBs 1 through 4 for four data links as an example of an IMA group. The read pointer ("Rptr") points to the location to read a cell for all of the DCBs 1 through 4. Each DCB, however, can have varying delays such that write pointers (Wptr 1, Wptr 2, Wptr 3, and Wptr 4) for each of the DCBs can point to varying locations.

In the example of FIG. 6A, the IMA group (for purposes of explanation) can have a group delay up to 275 milliseconds because of a slow link 1 that carries cells for DCB 1. In particular, Rptr is four cells behind Wptr 4 for DCB 4, three cells behind Wptr 3, and two cells behind Wptr 2. Over time Rptr can be behind up to a 1000 cells. For example, although the links 1 through 4 may have the same transmission rate, link 4 may transmit cells through less hops than the other links, which may cause more packets to arrive sooner. That is, if Wptr speed for links 1 through 4=(1 cell)/(276 microseconds)=3623 cells/second and Rptr speed may=(1 cell)/(275 microseconds)=3636 cells/second, the Rptr can catch up to the fast link. For example, if Rptr is 1000 cells behind, the time taken to drain out the DCB=1000/(relative speed of read-write pointers)=1000/(3636−3623)=1000/13=77 seconds (approximately) thus reducing the differential delay for the IMA group.

FIGS. 6B and 6C show a slow link (e.g., link 1) being deleted and a faster link (e.g., link 5) being added. Hence, using the buffering techniques described herein, the differential delay of the slow link (link 1) will exist for only 77 seconds. As a result of this solution, a new fast link could be added to the group once the delay is removed. Previously the link could never get added to the group. Consequently, a new faster link (link 5) can be added to the group after 77 seconds or 1 minute and 13 seconds later. As such, a stagnant delay can be removed in less than two minutes.

As shown in FIG. 6C, because Rptr can move slightly faster than the write pointer of the slowest link, which was link 1, if a wrap around condition occurs, the fast link will not over write cells because they have been read. In other embodiments, Rptr can change if encountering empty cells even though the cells are coming in on the links at normal pace. Thus, a method and system to provide graceful slow-link deletion and subsequent fast link addition in an IMA group have been described.

In the foregoing specification the invention has been described with reference to specific exemplary embodiments thereof. It will, however, be evident that various modifications and changes may be made thereto without departing from broader spirit and scope of the invention as set forth in the appended claims. The specification and drawings are, accordingly, to be regarded in an illustrative sense rather a restrictive sense.

What is claimed is:

1. A method comprising:
   receiving data on a plurality of data links, the data on at least two respective links being transmitted with a differential transmission delay, such that the plurality of data links includes a slow link having a first transmission delay and at least one other link having a second transmission delay, the first transmission delay longer than the second transmission delay;
   writing the data from the slow link to a first delay compensation buffer and the data from the at least one other link to a second delay compensation buffer, wherein a first write pointer for the first delay compensation buffer points to a different location relative to a second write pointer for the second delay compensation buffer; and
   reading the data from the delay compensation buffer for each data link faster than the data is written into the buffer.

2. The method of claim 1, wherein the receiving the data includes receiving an asynchronous transfer mode (ATM) data cell.

3. The method of claim 1, wherein the receiving data includes receiving the data on one or more T1/E1 data links.

4. The method of claim 1, further comprising:
   deleting the slow link such that the delay caused by the slow link is reduced.

5. The method of claim 4, further comprising:
   adding a fast link, having a transmission delay less than the second transmission delay, after the slow link is deleted and the transmission delay resulting from the slow link is reduced.

6. A machine-readable medium that provides instructions, which if executed by a processor, cause the processor to perform an operation comprising:
   receiving data on a plurality of data links, the data on at least two respective links being transmitted with a differential transmission delay, such that the plurality of data links includes a slow link having a first transmission delay and at least one other link having a second transmission delay, the first transmission delay longer than the second transmission delay;
   writing the data from the slow link to a first delay compensation buffer and the data from the at least one other link to a second delay compensation buffer, wherein a first write pointer for the first delay compensation buffer points to a different location relative to a second write pointer for the second delay compensation buffer; and
   reading the data from the delay compensation buffer for each data link faster than the data is written into the buffer.

7. The machine-readable medium of claim 6, further providing instructions, which if executed by the processor, cause the processor to perform an operation comprising:
   receiving an asynchronous transfer mode (ATM) data cell.

8. The machine-readable medium of claim 6, further providing instructions, which if executed by the processor, cause the processor to perform an operation comprising:
   receiving the data on one or more T1/E1 data links.

9. The machine-readable medium of claim 6, further providing instructions, which if executed by the processor, cause the processor to perform an operation comprising:

deleting the slow link such that the delay caused by the slow link is reduced.

10. The machine-readable medium of claim 6, further providing instructions, which if executed by the processor, cause the processor to perform an operation comprising:

adding a fast link, having a transmission delay less than the second transmission delay, after the slow link is deleted and the transmission delay resulting from the slow link is reduced.

11. A system for inverse multiplexing over an asynchronous transfer mode (ATM) network comprising:

means for receiving data on a plurality of data links, the data on at least two respective links being transmitted with a differential transmission delay, such that the plurality of data links includes a slow link having a first transmission delay and at least one other link having a second transmission delay, the first transmission delay longer than the second transmission delay;

means for writing the data from the slow link to a first delay compensation buffer and the data from the at least one other link to a second delay compensation buffer, wherein a first write pointer for the first delay compensation buffer points to a different location relative to a second write pointer for the second delay compensation buffer; and means for reading the data from the delay compensation buffer for each data link faster than the data is written into the buffer.

12. The system of claim 11, wherein the means for receiving the data includes means for receiving an asynchronous transfer mode (ATM) data cell.

13. The system of claim 11, wherein the means for receiving data includes means for receiving the data on one or more T1/E1 data links.

14. The system of claim 11, further comprising:

means for deleting the slow link such that the delay caused by the slow link is reduced.

15. The system of claim 13, further comprising:

means for adding a fast link, having a transmission delay less than the second transmission delay, after the slow link is deleted and the transmission delay resulting from the slow link is reduced.

* * * * *